United States Patent
Nishimura (10) Patent No.: US 7,014,135 B2
(45) Date of Patent: Mar. 21, 2006

(54) FISHING REEL

(75) Inventor: Yasushi Nishimura, Izumi (JP)

(73) Assignee: Shimano Inc., Osaka (JP)

( * ) Notice: Subject to any disclaimer, the term of this patent is extended or adjusted under 35 U.S.C. 154(b) by 72 days.

(21) Appl. No.: 10/636,706

(22) Filed: Aug. 8, 2003

(65) Prior Publication Data

US 2004/0041046 A1    Mar. 4, 2004

(30) Foreign Application Priority Data

Aug. 28, 2002 (JP) .............................. 2002-249252

(51) Int. Cl.
*A01K 89/01* (2006.01)
(52) U.S. Cl. ............................................. 242/310
(58) Field of Classification Search ........ 242/310–312, 242/317
See application file for complete search history.

(56) References Cited

U.S. PATENT DOCUMENTS

| | | | | |
|---|---|---|---|---|
| 3,612,436 A | * | 10/1971 | Shakespeare et al. | 242/259 |
| 3,799,472 A | * | 3/1974 | Svensson | 242/270 |
| 3,974,977 A | * | 8/1976 | Kamikawa | 242/319 |
| 5,377,925 A | * | 1/1995 | Miyazaki | 242/312 |
| 5,878,972 A | * | 3/1999 | Okada et al. | 242/299 |
| 6,315,228 B1 | * | 11/2001 | Sato | 242/312 |
| 6,464,159 B1 | | 10/2002 | Nakagawa et al. | |
| 6,848,642 B1 | * | 2/2005 | Hitomi | 242/321 |

FOREIGN PATENT DOCUMENTS

| | | |
|---|---|---|
| EP | 1034699 A | 9/2000 |
| JP | 7-124995 A | 5/1995 |
| JP | 11-129964 A | 5/1999 |
| JP | 2001-169692 A | 6/2001 |
| JP | 2002-034401 A | 2/2002 |

* cited by examiner

*Primary Examiner*—Emmanuel Marcelo
(74) *Attorney, Agent, or Firm*—Shinjyu Global IP Couselors, LLP (57) ABSTRACT

A first side cover of a dual bearing reel is fastened by threadedly coupling screws from the inner side of a first side plate to a plurality of cylindrical portions that are attached to the inner surface of the first side cover. Alumite is formed on the aluminum alloy-made first side cover. A fine triazine thiol powder is diffused on the inner surface of the first side cover by an electrodeposition plating process such that an electrodeposition layer is formed thereon. The cylindrical portions are attached to the inner surface of the first side cover by inserting at least a portion of the first side cover into a die and outsert or insert-molding the cylindrical portions to the electrodeposition layer. It is possible to control increases in the cost of a decorative member, control the exposure of attachment portions, and provide an expensive appearance to the decorative member.

9 Claims, 10 Drawing Sheets

FISHING REEL

BACKGROUND OF THE INVENTION

1. Field of the Invention

This invention generally relates to a decorative member. More specifically, the present invention relates to a decorative member for outdoor use that has a surface that is externally exposed and adapted to be used outdoors.

2. Background Information

A decorative member for outdoor use such as a reel unit of a fishing reel or a counter case for a water depth display has a surface that is externally exposed. Such decorative member is provided, on the interior, with concave or convex portions such as installation bosses or bearing support members. For example, in a dual bearing reel, a boss for installing a coil spring on the interior of the side cover of the reel body, and a threaded installation boss are disposed such that they project inward.

In the conventional art, decorative members are often manufactured by resin injection molding or by aluminum die-casting because these types of concave or convex portions are needed. When performing aluminum die-casting, a substantial amount of silicon is often added to the aluminum alloy in order to improve fluidity. Because of this, the decorative member will take on a whitish color, and a high quality appearance will be difficult to obtain even after an alumite treatment has been performed thereon.

Thus, finishing process such as plating or painting is performed on members that are formed from resin or by aluminum die-casting, so that a high quality metal-like finish can be obtained. However, these methods cannot produce a metal-like finish having a high quality luster. Instead, these methods will produce a finish that appears cheap.

Accordingly, forged or press molded members are used in high quality products in order to provide an expensive metal-like finish. Because it is not necessary to improve fluidity, forged members are provided with a high quality finish by using a surface treatment such as an alumite treatment or the like. Likewise, press molded members are provided with a high quality finish with the same type of surface treatment.

With conventional decorative members in which forged members are used, a plurality of post-manufacturing processes must be performed in order to form the concave or convex portions, which further increases the costs. In addition, with conventional decorative members in which press molded members are used, attachment portions such as screw holes and rivet holes for installing the concave or convex portions are exposed in the surface thereof, which creates problems with the aesthetic appearance of the product.

In view of the above, there exists a need for a decorative member which overcomes the above mentioned problems in the prior art. This invention addresses this need in the prior art as well as other needs, which will become apparent to those skilled in the art from this disclosure.

SUMMARY OF THE INVENTION

Purposes of the present invention are to prevent an increase in the cost of decorative members for outdoor use, to prevent the exposure of attachment portions in the surface of the decorative member, and to provide an expensive appearance to the decorative member.

A decorative member for outdoor use according to the first aspect of the present invention has an external surface that is exposed externally, and is adapted to be coupled to a main functional member. The decorative member includes an outer member and at least one inner member. The outer member is a metal member having inner and outer surfaces. The inner member for installation/support is made of a synthetic resin, and is fixedly attached to the inner surface of the outer member such that the decorative member is adapted to be coupled to the main function member via the inner member.

In this decorative member for outdoor use, the outer member having a surface that is exposed externally is made of metal, and the inner member for installation/support is made of a synthetic resin and is fixedly attached to the inner surface of the outer member. Here, because there is little limitation with respect to the metal outer member, a high quality outer appearance can be obtained without post-processing even when forging is employed to form the metal outer member. In addition, because the inner member is fixedly attached to the interior surface of the outer member, the attachment portions for installation/support are not exposed on the surface even when a press-molded member is employed as the inner member. Because of this, cost increases are prevented, exposure of the attachment portions on the surface is prevented, and an expensive exterior appearance can be obtained.

The decorative member for outdoor use according to the second aspect of the invention is the decorative member as set forth in the first aspect, in which the inner members is a cylindrical portion that is mounted to the inner surface of the outer member. In this situation, an expensive exterior appearance can be maintained even when a plurality of cylindrical portions for are provided.

The decorative member for outdoor use according to the third aspect of the invention is the decorative member as set forth in the first or the second aspect, wherein the decorative member as a plurality of inner members that are linked together by a linking portion. In this situation, by linking the plurality of inner members with the linking portion, the task of installing the inner members is simplified because the number of parts is reduced.

The decorative member for outdoor use according to the fourth aspect of the invention is the decorative member as set forth in any of the first through third aspects, wherein the outer member is made of an aluminum alloy. In this situation, by employing, for example, a press molded aluminum alloy plate as the outer member, an expensive exterior appearance can be obtained because a whitish color can be prevented from developing due to the addition of silicon when die casting the aluminum.

The decorative member for outdoor use according to the fifth aspect of the present invention is the decorative member set forth in the fourth aspect, wherein the inner and outer surfaces of the outer member are subjected to an alumite treatment. In this situation, the surfaces of the outer member can be prevented from damage, and its corrosion resistance can be improved.

The decorative member for outdoor use according to the sixth aspect of the present invention is the decorative member set forth in any of the first through fifth aspects, wherein the inner members is made of one synthetic resin selected from the group consisting of polyamide resins, polyphenylene sulfide (PPS) resins, polyethylene resins (PE), and polypropylene (PP) resins. In this situation, by forming the inner members from one synthetic resin selected from the group consisting of polyamide resins, polyphenylene sulfide (PPS) resins, polyethylene resins (PE), and polypropylene (PP) resins, cost increases can be further prevented.

The decorative member for outdoor use according to the seventh aspect of the invention is the decorative member set forth in any of the first through sixth aspects, in which the outer member is at least partially inserted into a die and is integrally formed with the inner member. In this situation, it is easier to form the inner members when at least a portion of the outer member is inserted into a die, and outsert or insert molding of the inner members is performed.

The decorative member for outdoor use according to the eighth aspect of the invention is the decorative member set forth in any of the first through seventh aspects, wherein the inner member is attached to the outer member by chemical bonding. In this situation, the inner member will be firmly bonded to the outer member.

The decorative member for outdoor use according to the ninth aspect of the invention is the decorative member set forth in the eighth aspect, wherein the inner members is connected to the inner surface of the outer member by diffusing a fine triazine thiol powder on the inner surface of the outer member by means of an electro-deposition plating process, and then integrally forming the inner member to the inner surface of the outer member via this diffused powder. In this situation, the inner member will be firmly bonded to the outer member.

The decorative member for outdoor use according to the tenth aspect of the invention is the decorative member set forth in any of the first through ninth aspects, wherein the outer member includes a reel unit of a fishing reel. In this situation, cost increases are prevented, the exposure of the attachment portion on the surface is prevented, and a high quality exterior appearance can be obtained with, for example, the side covers or side plates of a dual bearing reel or the reel body of the reel unit of a spinning reel.

The decorative member for outdoor use according to the eleventh aspect of the invention is the decorative member disclosed in any of the first through ninth aspects, wherein the outer member includes a counter case for a water depth display for a fishing reel. In this situation, cost increases are prevented, the exposure of the attachment portion on the surface is prevented, and a high quality exterior appearance can be obtained with, for example, a counter case for an electric reel or a counter reel.

The decorative member for outdoor use according to the twelfth aspect of the invention is the member disclosed in any of the first through ninth aspects, wherein the outer member includes a case for a cycle computer capable of being mounted on a bicycle. In this situation, cost increases are prevented, the exposure of the attachment portion on the surface is prevented, and a high quality exterior appearance can be obtained with a case for a cycle computer.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
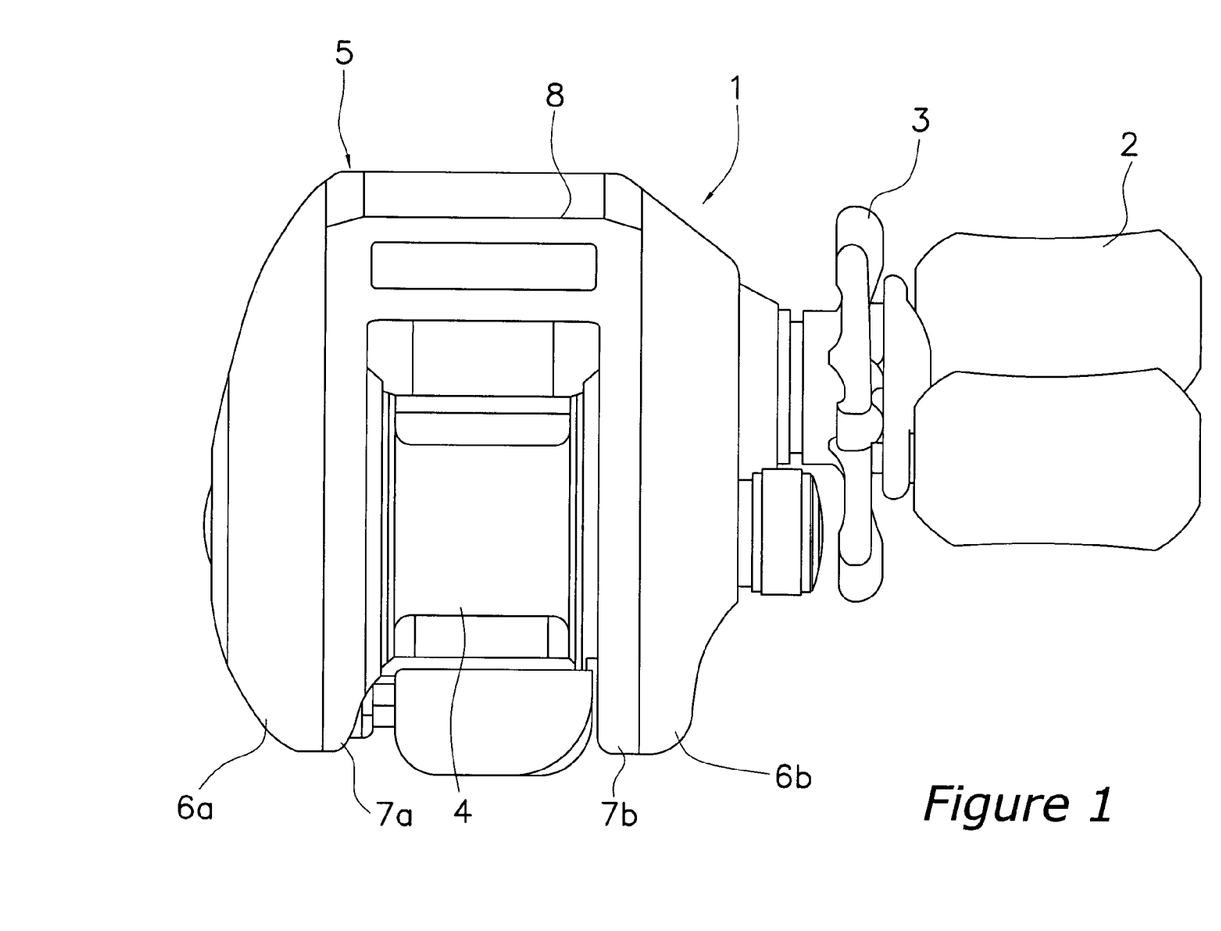
FIG. 1 is a plan view of a dual-bearing reel in accordance with one embodiment of the present invention.

As shown in FIG. 1, a dual bearing reel in which an embodiment of the present invention is applied has a low profile-type reel to be used for bait casting. This dual bearing reel includes a reel unit 1, a handle assembly 2 that is disposed on one side of the reel unit 1 for rotating a spool 4, and the spool 4 for winding fishing line mounted rotatively and detachably within the reel unit 1. A star drag 3 for adjusting drag is provided on the same side of the reel unit 1 as the handle assembly 2.

The reel unit 1 has a frame 5, and a first side cover 6a and a second side cover 6b that are mounted to both sides of the frame 5.

The frame 5 is made of an aluminum alloy. The first side cover 6a and the second side cover 6b (examples of the outer member) have a first side plate 7a and a second side plate 7b that are respectively mounted thereto, and a plurality of connecting portions 8 that connect the first side plate 7a and the second side plate 7b. The first side plate 7a and the second side plate 7b are integrally formed with the connecting portions 8.

Figure 2:
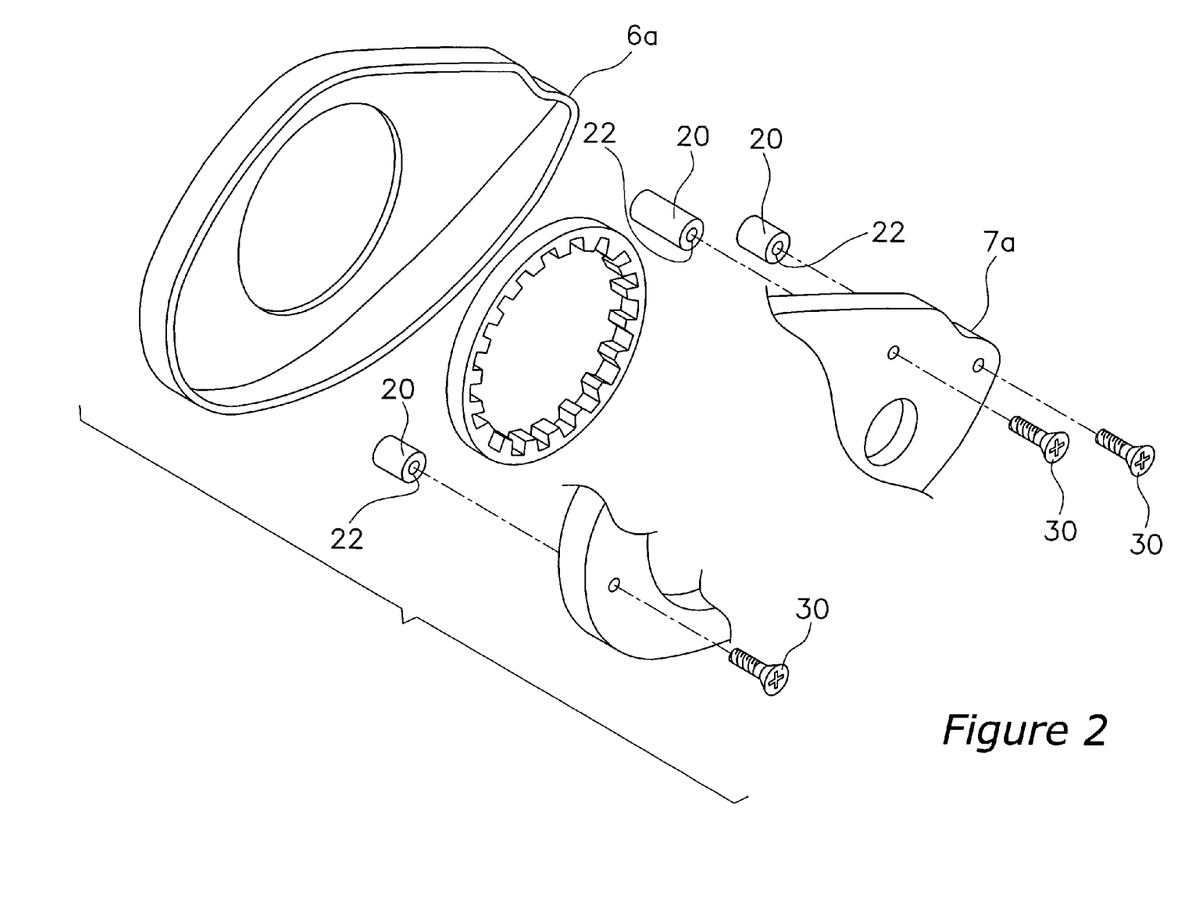
FIG. 2 is an exploded perspective view showing the area around the mounting portions of the first side cover in accordance with the embodiment of the present invention.
Figure 3:
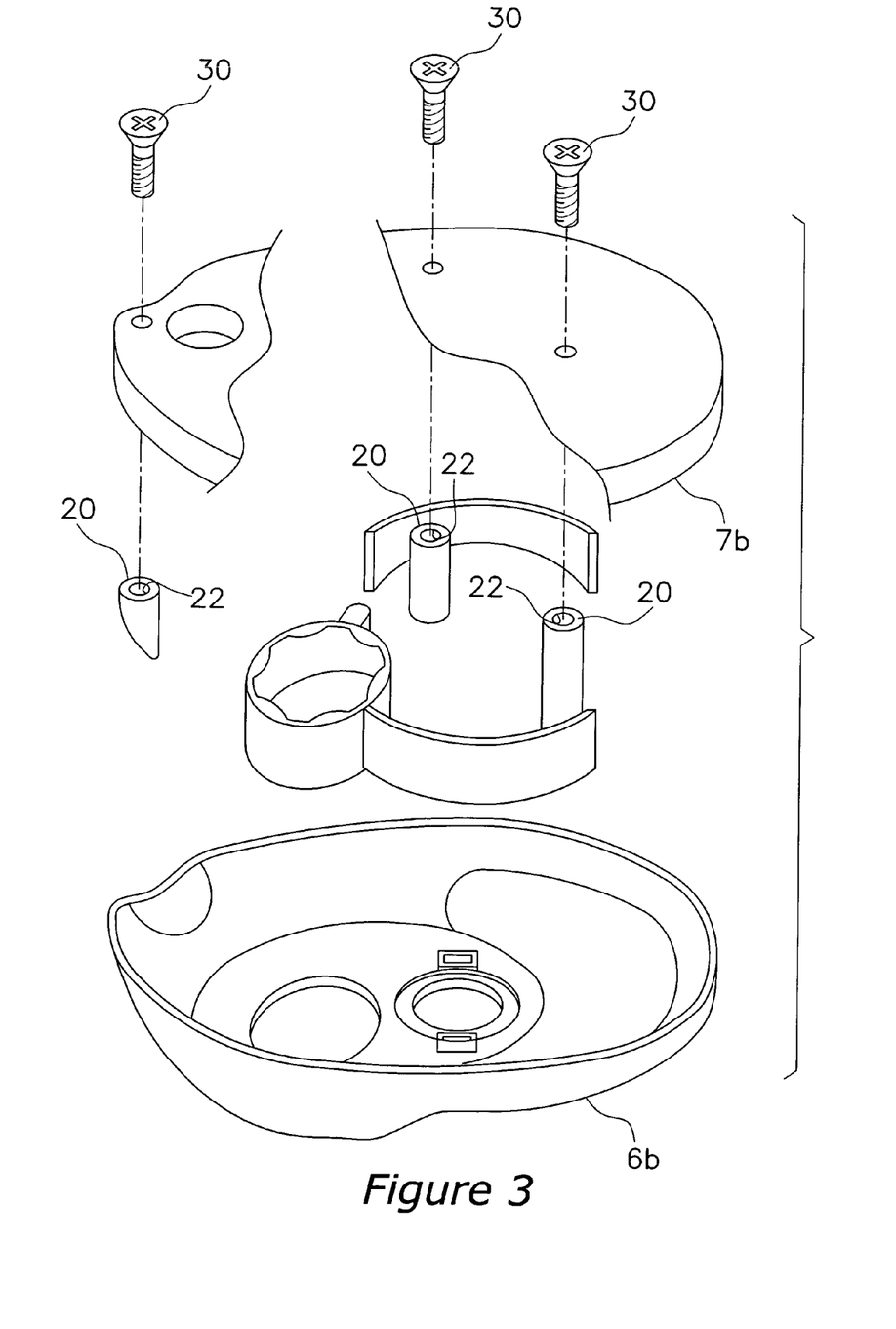
FIG. 3 is an exploded perspective view showing the area around the mounting portions of the second side cover in accordance with the embodiment of the present invention.

As shown in FIGS. 2 and 3, the first side cover 6a and the second side cover 6b are coupled to the first and second side plates 7a and 7b by threadedly coupling screw members 30 into a plurality of cylindrical portions 20 (examples of inner members and coupling members) from the inner sides of the first side plate 7a and the second side plate 7b. The cylindrical portions 20 are fixedly attached to the inner surfaces of the first side cover 6a and the second side cover 6b such that said cylindrical portions 20 and the first side cover 6a, and the cylindrical portions 20 and the second side cover 6b respectively are formed as one-piece unitary members. Accordingly, the first and second side covers 6a and 6b are coupled to the first and second side plates 7b (examples of main functional members) via the cylindrical portions 20. Because of this, screw members 30 are not exposed on the surfaces of the first side cover 6a and the second side cover 6b. The first side cover 6a and the second side cover 6b are formed by press molding an aluminum alloy plate member.

The cylindrical portions 20 are made of a synthetic resin, and are bosses for installing/supporting the screw members 30. Concave portions 22 that are opened in the ends of the cylindrical portions 20 are formed by cutting and the like, and threaded portions are formed therein in order to mount the screw members 30. Although the cylindrical portions 20 are cylindrical members with threaded concave portion 22 formed thereon, the shapes of the cylindrical portion and the concave portion 22 are not limited to those described herein. The inner members of coupling members can have any shape as long as they can couple the outer member to the main functional member.

The cylindrical portions 20 are made of one synthetic resin selected from the group consisting of polyamide resins such as Nylon 6 or Nylon 66, polyphenylene sulfide (PPS) resins, polyethylene resins (PE), and polypropylene (PP) resins. The cylindrical portions 20 are attached to the first side cover 6a and the second side cover 6b by chemical bonding. Here, alumite 11 is formed on the aluminum alloy first side cover 6a and second side cover 6b (see FIG. 4). A fine triazine thiol powder is diffused on the inner surfaces of the first side cover 6a and second side cover 6b by an electro-deposition plating process to form an electro-deposition layer 12 (see FIG. 4), which will be described below. The cylindrical portions 20 are attached to the inner surface of the first side cover 6a and the second side cover 6b by inserting a portion of or the entire first side cover 6a and second side cover 6b into a die and outsert molding or insert molding the cylindrical portions 20 to the electro-deposition layer 12 on the portions of the cylindrical portions 20 that are inserted into the die.

More specifically, the cylindrical portions 20 are attached to the first side cover 6a and the second side cover 6b by performing an organic plating process using a special metal surface preparation agent RTD that chemically reacts with both a metal such as an aluminum alloy and a synthetic resin. Then, the RTD on the metal surface is directly attached to the synthetic resin within the die. Triazine thiol has a quality in which an R group therein will bond with a synthetic resin, and a sulfone group SH therein will bond with a metal. The fine triazine thiol powder is diffused by the electro-deposition plating process. Accordingly, the cylindrical portions 20 are firmly chemically bonded to the first side cover 6a and the second side cover 6b.

Figure 4:
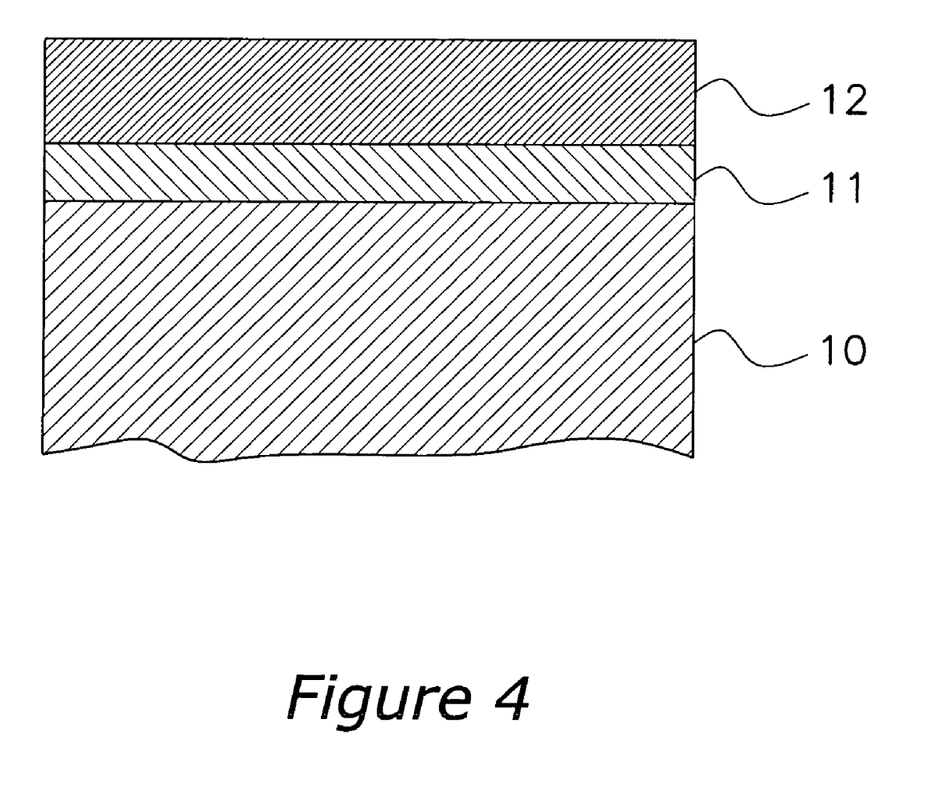
FIG. 4 is an enlarged cross-section of the reel unit in accordance with the embodiment of the present invention.

Each member (hereinafter generally referred to as component 10) that forms the reel unit 1 is made of an aluminum alloy, and an electro-deposition process is performed on the surfaces of the components 10. As shown in FIG. 4, alumite 11 is formed on the surface of the aluminum alloy components 10 by means of an alumite treatment. The electro-deposition layer 12 is formed on the surface of the alumite 11 by means of an electro-deposition process.

The alumite 11 is formed by anodizing the aluminum alloy. When the components 10 are made into anodes and subjected to electrolysis in a solution such as sulfuric acid, a film is formed thereon due to the oxygen that is generated by the anode.

The electro-deposition layer 12 is formed by diffusing fine triazine thiol powder by means of an electro-deposition plating process. When this type of electro-deposition is performed, the components 10 on which the alumite 11 has been formed are immersed into a coating tank, where the components 10 become cathodes and the electrode plate on which the coating layer is provided becomes an anode. In this manner, a coating is placed on the components 10 by applying a DC voltage thereto. Since formation of the alumite is well known in the art, further explanation is omitted herein.

In this dual bearing reel, the synthetic resin cylindrical portions 20 are fixedly attached to the inner surface of the first side cover 6a and the second side cover 6b. Here, because there are few limitations with respect to the metal first side cover 6a and the second side cover 6b, an expensive exterior appearance can be obtained without post-processing even if forging is employed. In addition, because the cylindrical portions 20 are fixedly attached to the interior surface of the first side cover 6a and the second side cover 6b, the attachment portions for installation/support are not exposed on the surface even if a press molded member is employed in the dual-bearing reel. Thus, cost increases are prevented, the exposure of the attachment portion on the surface is prevented, and an expensive exterior appearance can be obtained.

OTHER EMBODIMENTS (a) In the aforementioned embodiment, a dual bearing reel for bait casting was used as an example to describe the decorative member for outdoor use. However, the present invention is not limited thereto. For example, the present invention can be applied to fishing reels such as a round type dual bearing reel, a spinning reel, or a single bearing reel. In addition, as shown in FIGS. 5 and 6, the present invention can also be applied to a counter case of a counter reel.

Figure 5:
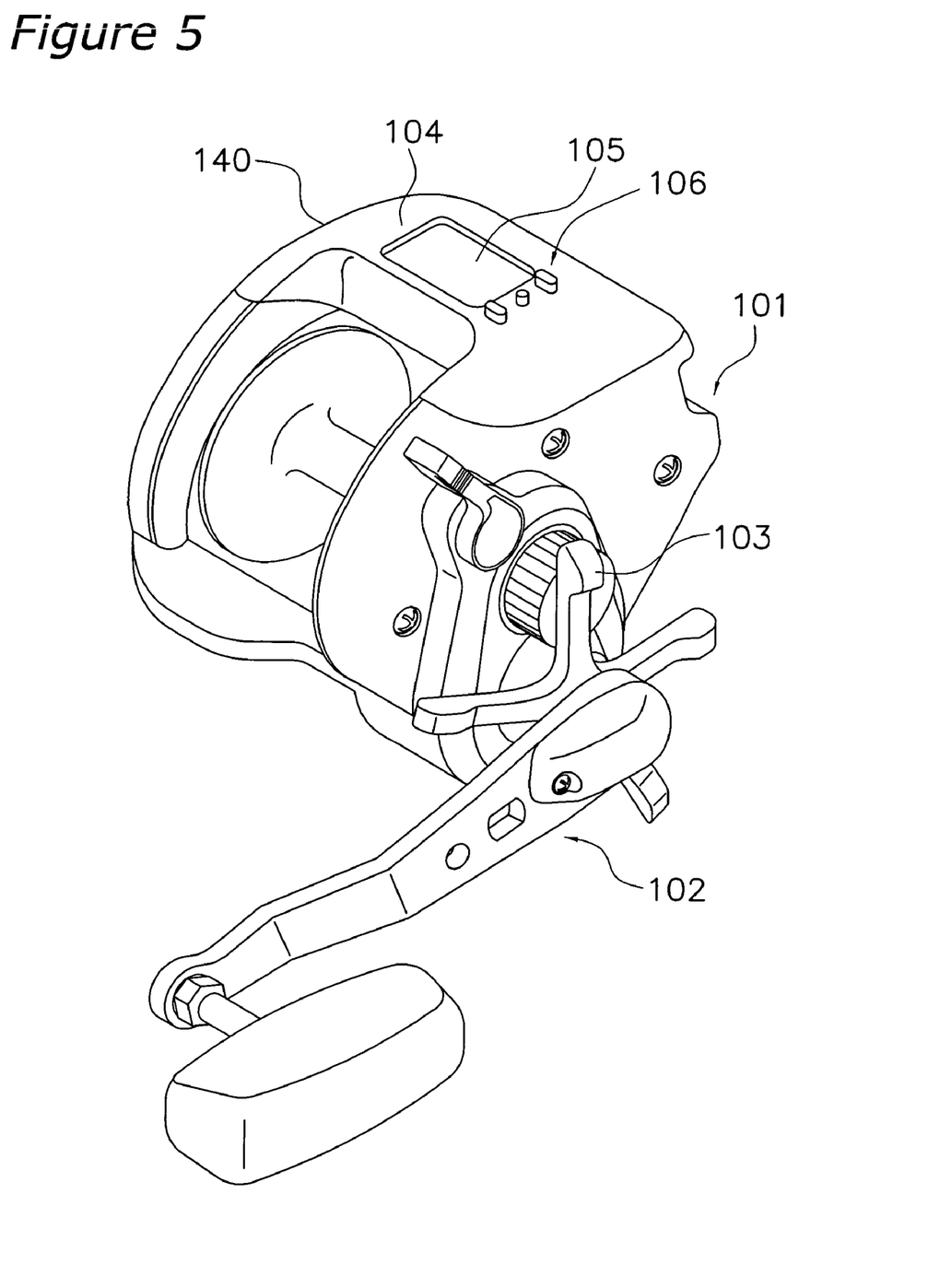
FIG. 5 is a perspective view of a counter reel in accordance with another embodiment of the present invention.

As shown in FIG. 5, a counter reel in accordance with another embodiment of the present invention primarily includes a reel unit 101, a handle 102 for rotating a spool that is disposed on the side of the reel unit 101, and a star drag 103 for adjusting drag that is provided on the side of the reel unit 101 closer to the handle 102. A counter case 104 for displaying water depth is fixedly coupled to an upper portion of the reel unit 101 (another example of main functional member).

Figure 6:
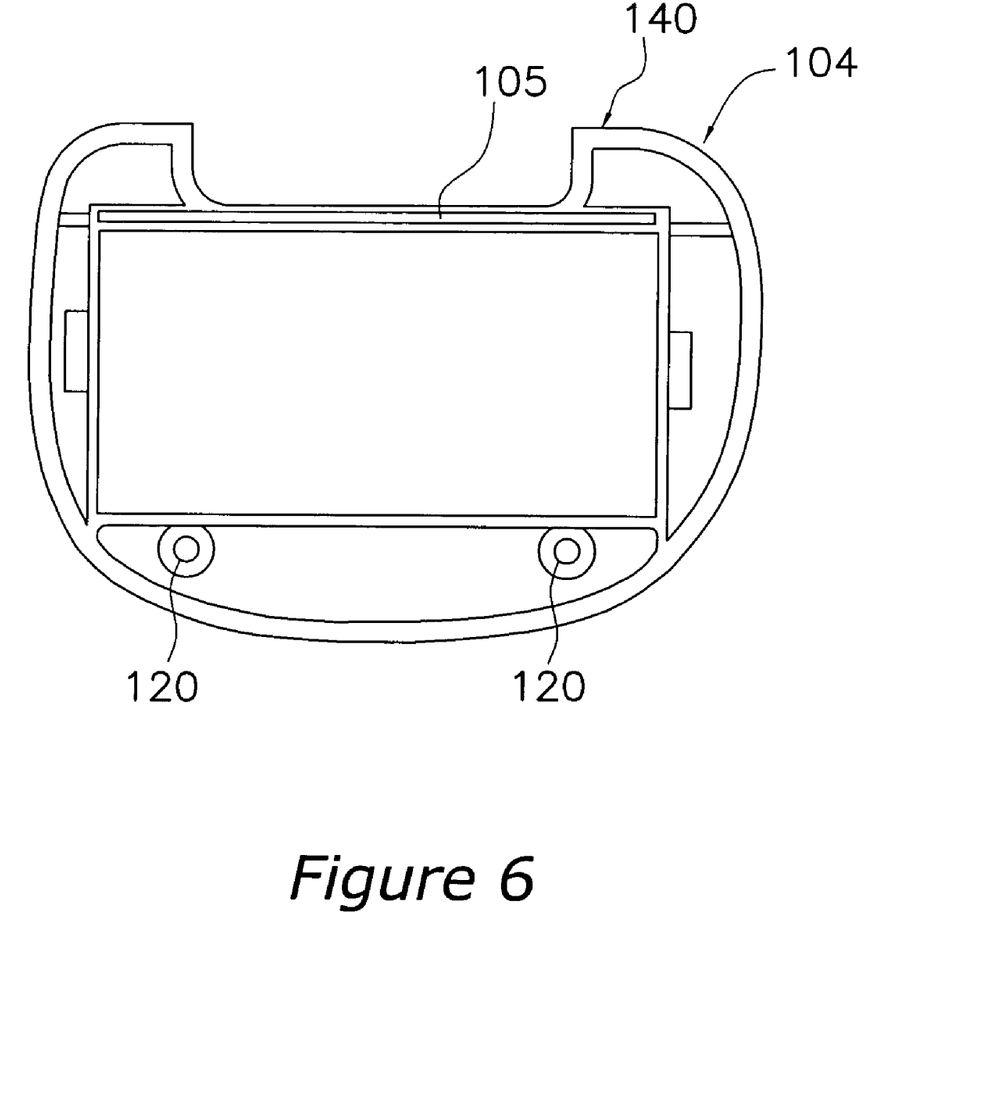
FIG. 6 is a bottom view of the counter case in accordance with the second embodiment of the present invention.

As shown in FIGS. 5 and 6, the counter case 104 (another example of outer member) has an upper case member 140 that includes a space in the interior thereof that is open on a bottom portion thereof, and a lower case member (not shown in the figures) that covers the opening in the upper case member 140. The upper case member 140 is made of an aluminum alloy, and is provided with a display 105 and operation keys 106 that are disposed on the right side of the display 105. The display 105 is formed of a liquid crystal display.

As shown in FIG. 6, two cylindrical portions 120 (another example of inner members) made of synthetic resin are attached to a front edge of the inner surface of the upper case member 140 on the left side and the right side of the upper case member 140. The method of attaching the cylindrical portions 120 and the upper case member 140 is identical to the aforementioned embodiment and is therefore omitted. With this counter reel, because cylindrical portions 120 that are made of synthetic resin are fixedly attached to the inner surface of the metal upper case member 140, cost increases are prevented, the exposure of the attachment portion on the surface is prevented, and a high quality exterior appearance can be obtained.

Figure 7:
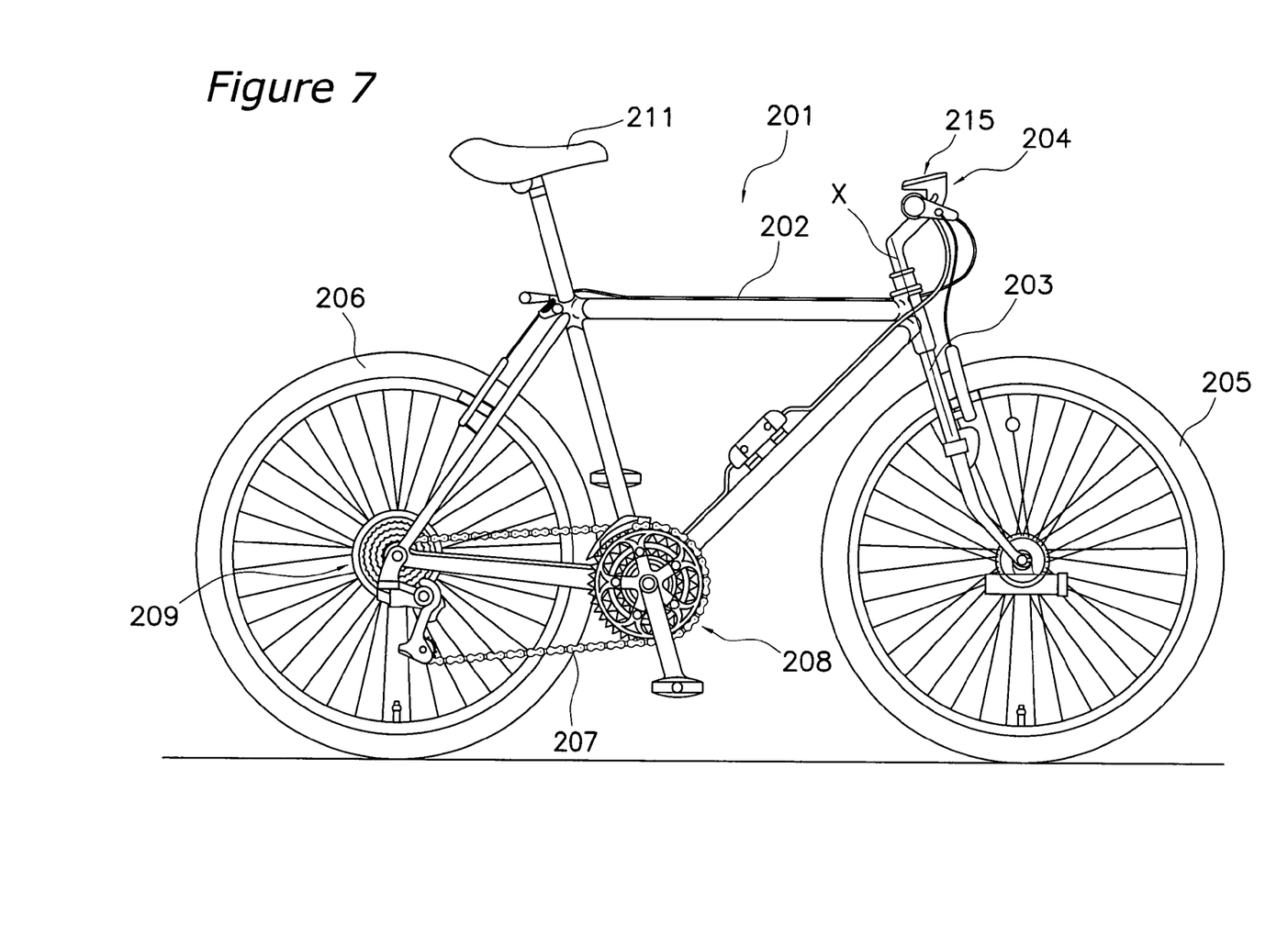
FIG. 7 is a lateral view of a bicycle in accordance with still another embodiment of the present invention.
Figure 8:
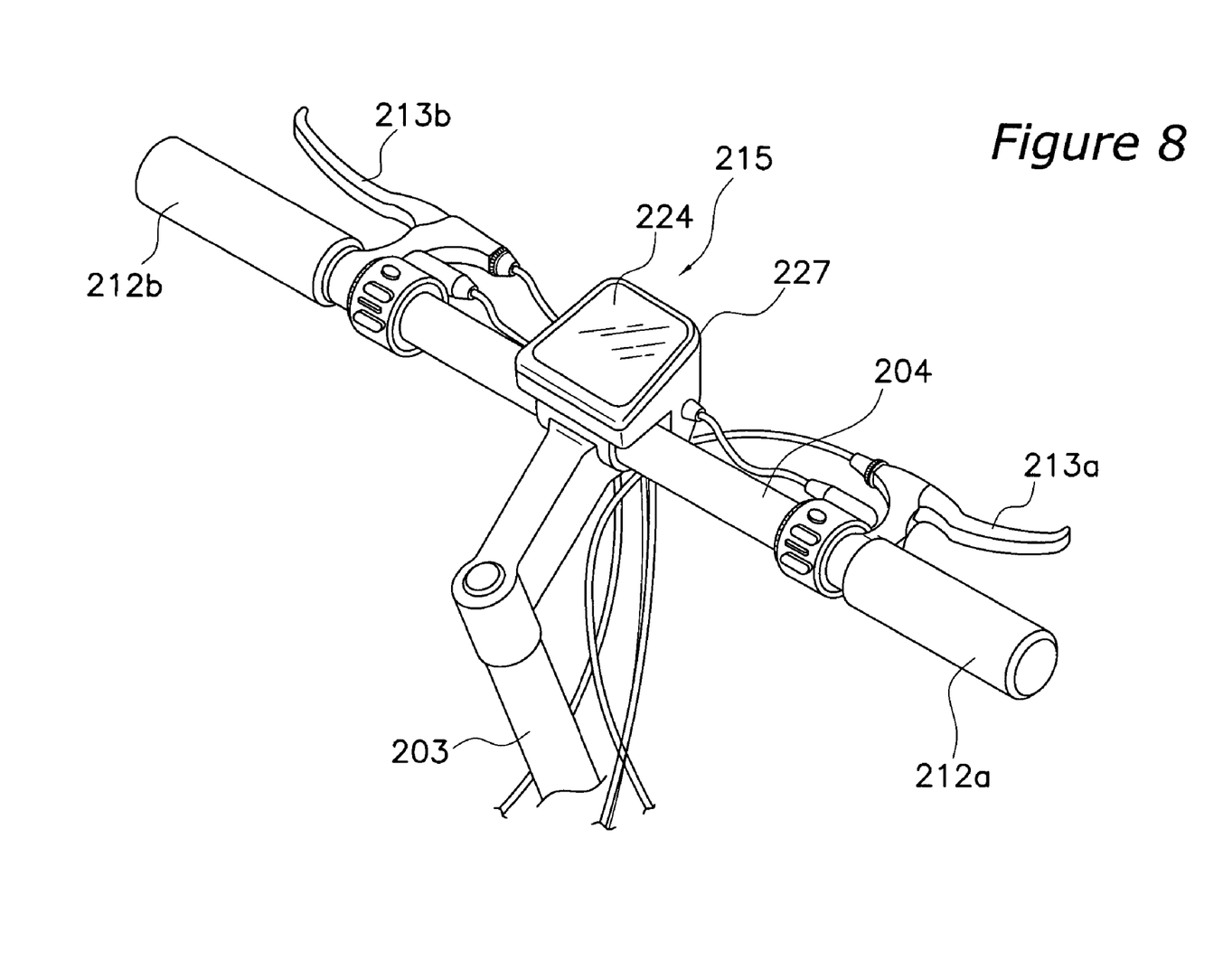
FIG. 8 is an enlarged perspective view of the bicycle in accordance with the third embodiment of the present invention.
Figure 9:
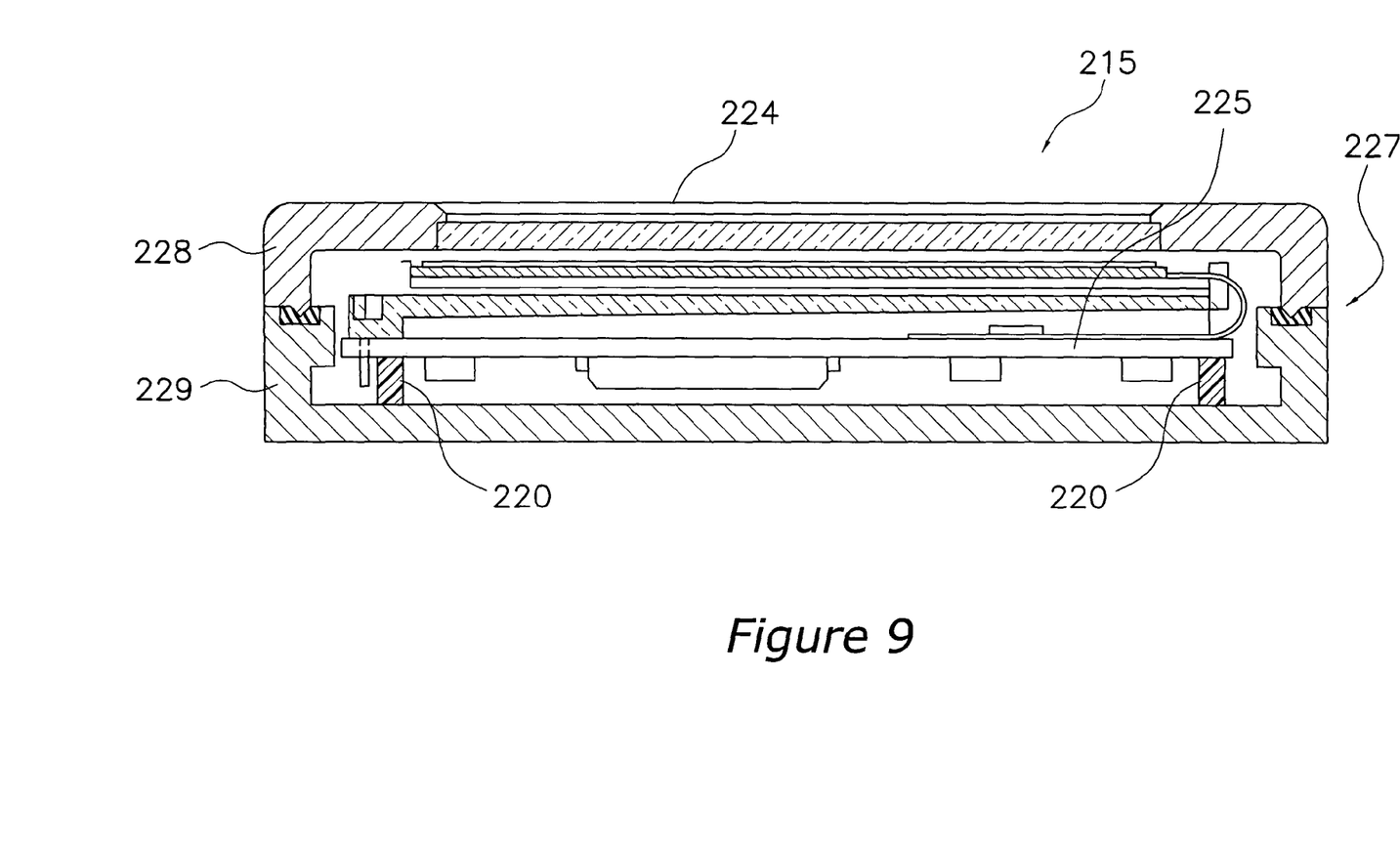
FIG. 9 is a cross sectional view of a case for a cycle computer in accordance with the third embodiment of the present invention.

In addition, as shown in FIGS. 7 to 9, the present invention can also be applied to a case for a cycle computer on a bicycle. A bicycle in accordance with these embodiments of the present invention is shown in FIGS. 7 and 8.

As shown in FIG. 7, a bicycle 201 is a mountain bike type of sports vehicle, and essentially includes a frame 202, a front fork 203, a handle 204, a front wheel 205, a rear wheel 206, a chain 207, a front external transmission 208, and a rear external transmission 209.

The frame 202 serves as the base of the bicycle 201. The frame 202 has the front fork 203 disposed on its front portion, the front external transmission 208 disposed on its lower central portion, and the rear wheel 206 and rear external transmission 209 disposed on its rear portion. In addition, a saddle 211 on which a rider sits is disposed on the upper central portion of the frame 202.

The front fork 203 is mounted to a front portion of the frame 202 so as to be freely pivotable with respect to an axis X that is diagonally inclined. The handle 204 is mounted on the upper portion of the front fork 203, and a front wheel 205 is mounted on the lower portion of the front fork 203.

As shown in FIG. 8, grips 212a, 212b, and brake levers 213a, 213b are provided on both ends of the handle 204. In addition, a speed control device 215 that can display the speed at which the bicycle is traveling is mounted on a central portion of the handle 204.

The speed control device 215 is disposed in a box-shaped control case 227, and a display 224 is disposed on the upper surface of the control case 227. As shown in FIG. 9, the case 227 has an upper case 228 in which the display 224 (another example of main functional member) is disposed, and a lower case 229 (another example of outer member) that is disposed opposite the upper case 228. The upper case 228 and the lower case 229 are made of an aluminum alloy. Cylindrical portions 220, which are made of a synthetic resin and serve to support various substrates 225 (another example of inner members) of the display 224, are attached to the surface of the lower case 229 that faces the upper case 228. In other words, the lower case 229 supports the substrates 225 via the cylindrical portions 220. The method of attaching the cylindrical portions 220 and the lower case member 229 is identical to the aforementioned embodiment and is therefore omitted. With this speed control device 215, because cylindrical portions 220 that are made of synthetic resin are fixedly attached to the inner surface of the metal lower case member 229, cost increases are prevented, the exposure of the attachment portion on the surface is prevented, and an expensive exterior appearance can be obtained.

Figure 10:
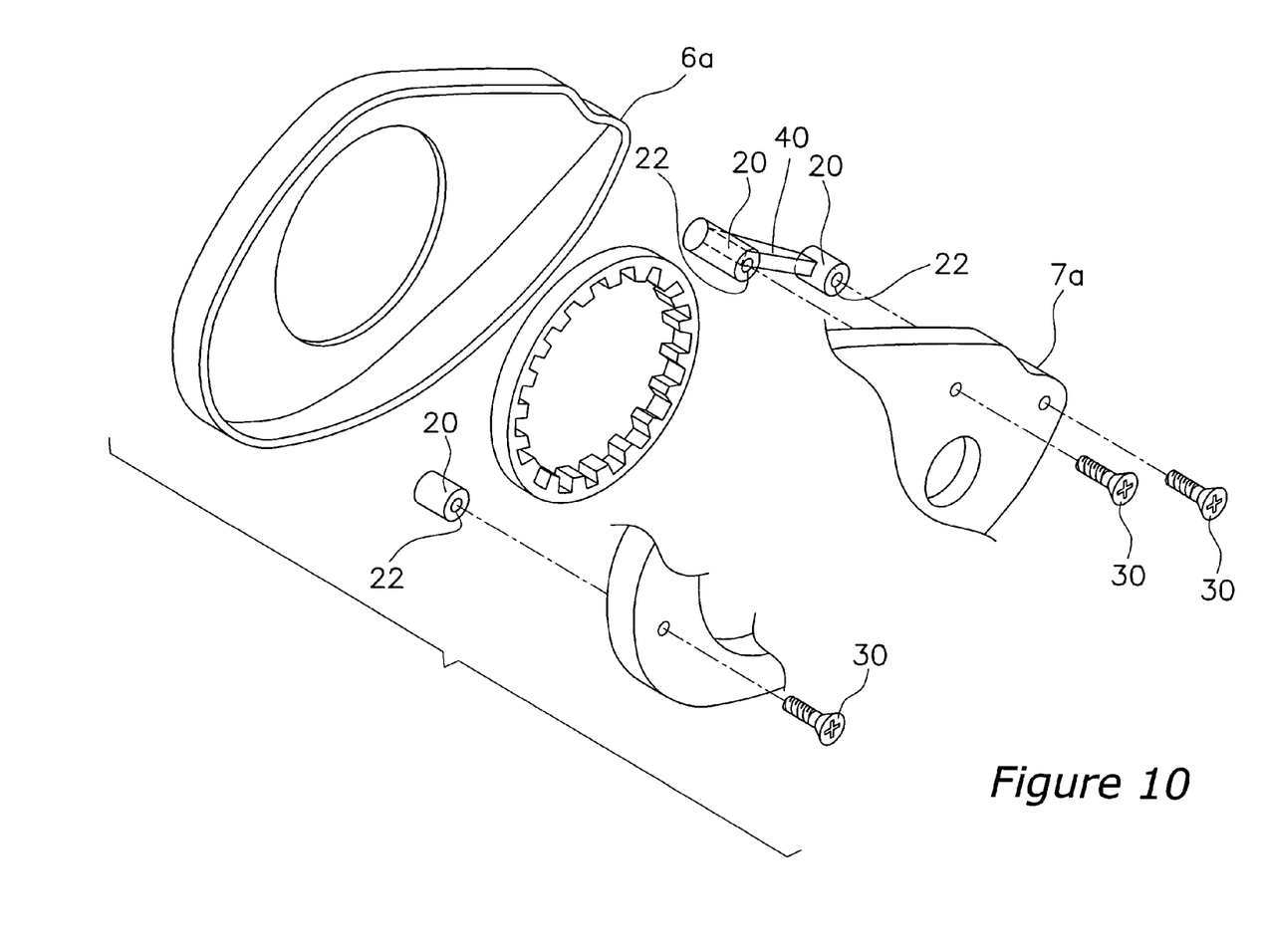
FIG. 10 is a broken perspective view of the side cover and the cylindrical portions in accordance with the fourth embodiment of the present invention.

(b) In the previous embodiment, a fine triazine thiol powder was diffused by an electro-deposition plating process and then chemical bonding was performed. However, the attachment method is not limited thereto. The inner member may be attached to the outer member by any conventional adhesion methods. For instance, the inner may be attached to the outer member with epoxy-type, acryl-type, or urethane-type adhesives (c) In the previous embodiment, a plurality of cylindrical portions 20 was provided. However, as shown in FIG. 10, the cylindrical portions 20 may be linked to one another via a linking portion 40, such that the cylindrical portions 20 and the linking portion 40 form a one-piece unitary member. Still alternatively, there may be provided only one cylindrical portion. In addition, the cylindrical portions 20 are bosses for installing/supporting the screw members 30 in the aforementioned embodiments. However, the inner members may also be projections which do not have the concave portions.

Furthermore, although the inner members or the coupling members are embodied as the cylindrical portions in the aforementioned embodiments, the shape of the inner members is not limited thereby. The inner member or the coupling member may take any shape as long as the outer member or the side covers can be coupled to the main functional member or the side plates via the inner member or the coupling member.

According to the present invention, cost increases are prevented, the exposure of the attachment portions on the surface is prevented, and an expensive exterior appearance can be obtained because inner members made of synthetic resin are fixedly attached to the inner surface of a metal outer member.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-249252. The entire disclosure of Japanese Patent Application No. 2002-249252 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A fishing reel, comprising:
   a reel unit having
      a pair of side plates connected to one another via a connecting portion,
      a pair of side covers, at least one of said side covers being made of metal and having inner and outer surfaces, and
      coupling members, at least one of said coupling members being made of a synthetic resin and fixedly and undetachably attached to said inner surface of said metal-made side cover, such that said metal-made side cover is coupled to one of said pair of side plates via said synthetic resin-made coupling member with said coupling member being covered by said side cover;
   a handle disposed on a side of said reel unit; and
   a spool rotatively mounted to said reel unit so as to rotate as said handle rotates.
2. The fishing reel set forth in claim 1, wherein said coupling members are cylindrical members that are mounted to said inner surface of said side covers.
3. The fishing reel set forth in claim 1, wherein said coupling members are linked to one another.
4. The fishing reel set forth in claim 1, wherein said side covers are made of an aluminum alloy.

5. The fishing reel set forth in claim 4, wherein
said inner and outer surfaces of said side covers are subjected to an alumite treatment.

6. The fishing reel set forth in claim 1, wherein
said coupling members are made of one synthetic resin selected from a group consisting of polyamide resins, polyphenylene sulfide (PPS) resins, polyethylene resins (PE), and polypropylene (PP) resins.

7. The fishing reel set forth in claim 1, wherein
said coupling members are formed uniformly with said side covers as one-piece unitary members, by inserting said side covers at least partially into a die.

8. The fishing reel set forth in claim 1, wherein
said coupling members are attached to said side covers by chemical bonding.

9. The fishing reel set forth in claim 8, wherein
said coupling members are attached to said inner surface of said side covers by diffusing a fine triazine thiol powder on said inner surface of said side covers by an electro-deposition plating process and then integrally forming said coupling members with said inner surface of said side covers via said diffused triazine thiol powder.

* * * * *